United States Patent
Hao et al.

(10) Patent No.: US 7,791,245 B1
(45) Date of Patent: Sep. 7, 2010

(54) OPTIMIZED ELECTRIC MACHINE FOR SMART ACTUATORS

(75) Inventors: Lei Hao, Troy, MI (US); Chandra S. Namuduri, Troy, MI (US); Balarama V. Murty, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 2 days.

(21) Appl. No.: 12/409,663

(22) Filed: Mar. 24, 2009

(51) Int. Cl.
*H02K 1/22* (2006.01)

(52) U.S. Cl. .................. 310/266; 310/114; 310/184

(58) Field of Classification Search ............... 310/179, 310/184, 198, 266, 112–114, 156.12
See application file for complete search history.

(56) References Cited

U.S. PATENT DOCUMENTS

| | | | | |
|---|---|---|---|---|
| 4,375,047 A | * | 2/1983 | Nelson et al. | 318/48 |
| 4,517,484 A | * | 5/1985 | Dacier | 310/266 |
| 5,107,156 A | * | 4/1992 | Jaun et al. | 310/162 |
| 5,289,072 A | * | 2/1994 | Lange | 310/266 |
| 5,345,133 A | * | 9/1994 | Satake | 310/266 |
| 5,783,893 A | * | 7/1998 | Dade et al. | 310/266 |
| 7,443,642 B2 | * | 10/2008 | Dooley | 361/23 |
| 2006/0226721 A1 | * | 10/2006 | Dooley et al. | 310/113 |
| 2006/0284509 A1 | * | 12/2006 | Han et al. | 310/156.81 |
| 2007/0216248 A1 | * | 9/2007 | Han et al. | 310/114 |
| 2007/0267931 A1 | * | 11/2007 | Dooley et al. | 310/180 |

* cited by examiner

*Primary Examiner*—Thanh Lam

(57) ABSTRACT

An electric machine includes a plurality of magnets for generating a first magnetic field. A magnet holder retains the plurality of magnets. A first stator is disposed radially outward from the magnet holder for generating a second magnetic field. The first stator includes a plurality of stator poles separated by slots with each of the stator poles having a concentrated winding with a respective number of turns formed around each respective stator pole. A second stator is disposed radially inward from the magnet for generating a third magnetic field. The second stator has a plurality of stator poles separated by slots with each of the stator poles having a concentrated winding with a respective number of turns formed around each respective stator pole. The magnet holder and magnets retained therein are rotatable between the first stator and second stator.

17 Claims, 4 Drawing Sheets

| Pole / Slot | 2 | 4 | 6 | 8 | 10 | 12 | 14 | 16 |
|---|---|---|---|---|---|---|---|---|
| 3 | 6 | 12 | | | | | | |
| 6 | | 12 | | 24 | 30 | | | |
| 9 | | | 36 | 18 | 72/.945# | 90/.945# | 36 | 126/.473 | 144/.175 |
| 12 | | | | 24 | 60/.933* | | 84/.933* | 48 |
| 15 | | | | 30 | 120/.621 | 30 | 60/.906# | 210/.951# | 240/.951# |
| 18 | | | | 72 | 90/.647 | 36.866 | 126/.902* | 144/.931* |
| 21 | | | | 168/.468 | 210/.565 | 84 | 42 | 336/.851 |
| 24 | | | | | 120/463 | | 168/.760 | 48 |

OPTIMIZED ELECTRIC MACHINE FOR SMART ACTUATORS

BACKGROUND OF INVENTION

An embodiment relates generally to dual stator electric machines.

Electric machines are typically designed to achieve a specific operating characteristic. For example, electric machines with drag cup rotors have very low inertia properties. Induction machines typically exhibit torque ripple free properties, whereas conventional permanent magnet synchronous machines exhibit high torque to ampere ratios. However, achieving a respective specific operating characteristic typically results in the sacrifice of other operating characteristics. While each of the above examples achieve one of the desired operating characteristics, this is often done at the expense of not obtaining one of the other respective desired operating characteristics. That is, none of the devices described above are capable of exhibiting all of the desired operating characteristics in a single electric machine.

SUMMARY OF INVENTION

An advantage of an embodiment of the invention is an electric machine that provides optimal operating characteristics such as a high torque to ampere ratio, a high torque to inertia ratio, and low torque ripple.

An embodiment contemplates an electric machine. The electric machine includes a plurality of magnets for generating a first magnetic field. A magnet holder retains the plurality of magnets. The magnet holder has a circular configuration with the plurality of magnets being evenly positioned around the circular configuration of the magnet holder. A first stator is disposed radially outward from the magnet for generating a second magnetic field. The magnet and the first stator have a first air gap formed therebetween. The first stator includes a plurality of stator poles separated by slots with each of the stator poles having a concentrated winding with a respective number of turns formed around each respective stator pole. Each respective concentrated winding within the first stator comprises non-overlapping windings. A second stator is disposed radially inward from the magnet for generating a third magnetic field. The magnet and the second stator have a second air gap formed between. The second stator has a plurality of stator poles separated by slots with each of the stator poles having a concentrated winding with a respective number of turns formed around each respective stator pole. Each respective concentrated winding within the second stator comprises non-overlapping windings. The magnet holder and magnets retained therein are rotatable between the first stator and second stator. The employment of concentrated windings of the first stator and the second stator increases the active length of the stator within a package size by reducing the end turn length, and as a result, increases the torque density. The concentrated winding reduces an overhang of each respective winding with respect to each stator pole of each stator for improving machine efficiency.

DETAILED DESCRIPTION

Figure 1:
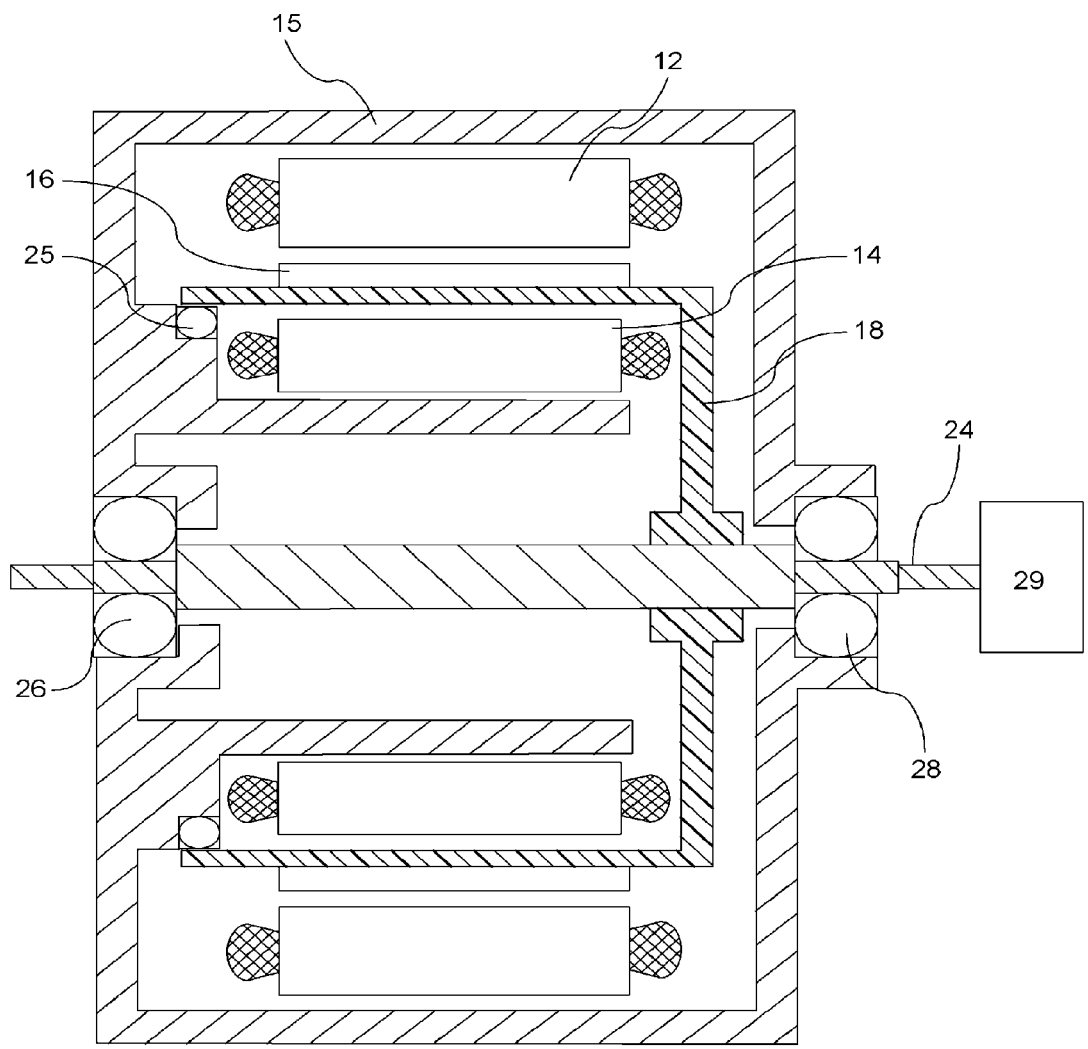
FIG. 1 is a cross section view of an electric machine along a diametric plane.
Figure 2:
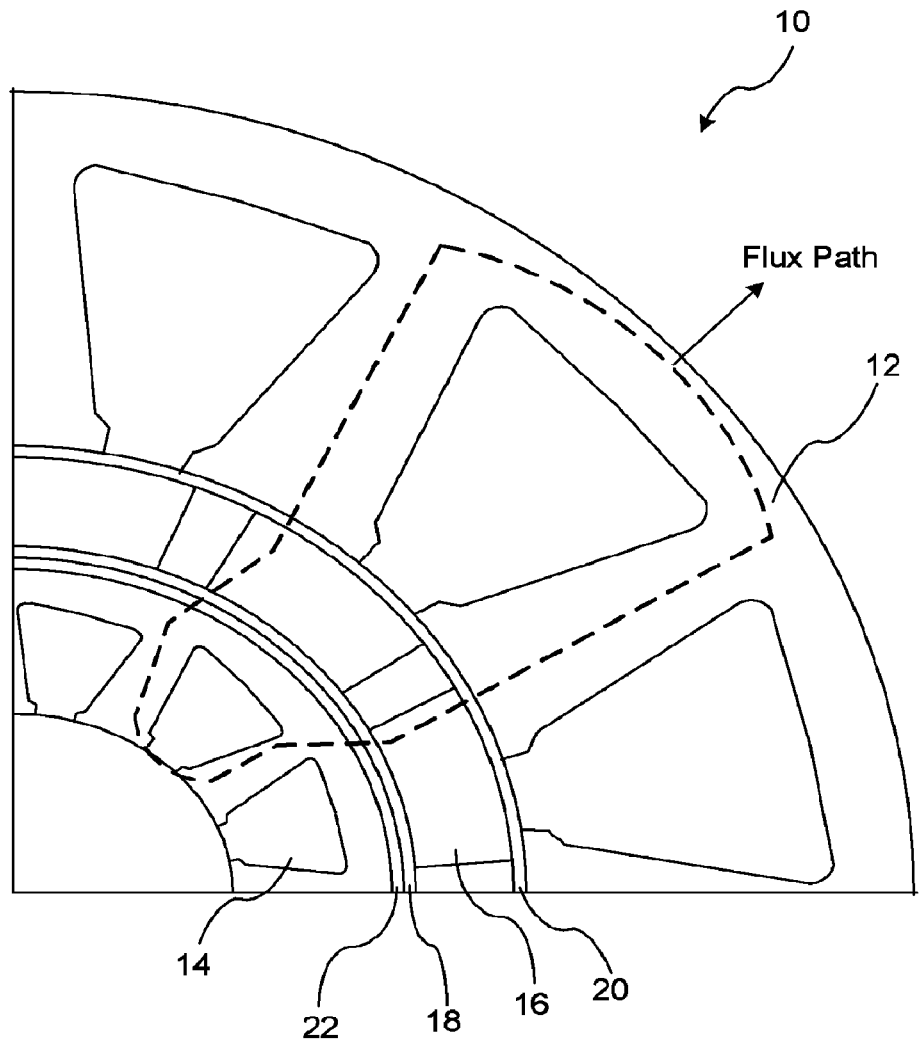
FIG. 2 is a cross section view of the electric machine along a transverse plane.

Referring to both FIGS. 1 and 2 there is shown a cross-section section views of an electric machine 10 along a diametric plane and a transverse plane, respectively. The electric machine 10 as described herein is used for devices and systems that require high torque and fast response times such as semi-active or active suspension systems, electric power steering systems, electromechanical braking systems or like systems. The electric machine 10 is a dual stator electric machine having a first stator 12 and a second stator 14 fixed within in a machine housing 15. The first stator 12 and the second stator 14 are coaxial to one another within the machine housing 15, and have different diameters. The first stator 12 and the second stator 14 have concentrated windings. Concentrated windings are non-overlapping windings which will be described in detail later.

Figure 3:
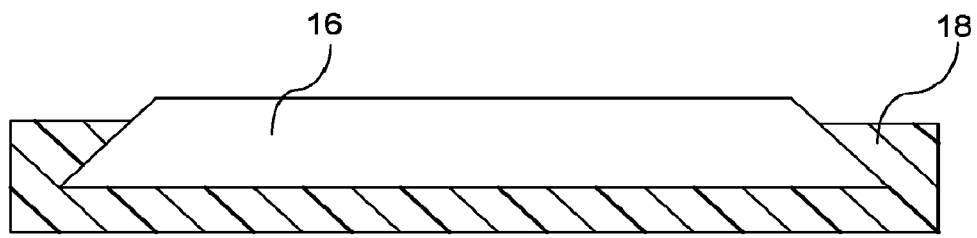
FIG. 3 is a cross section view of a magnetic holder and magnet.
Figure 4:
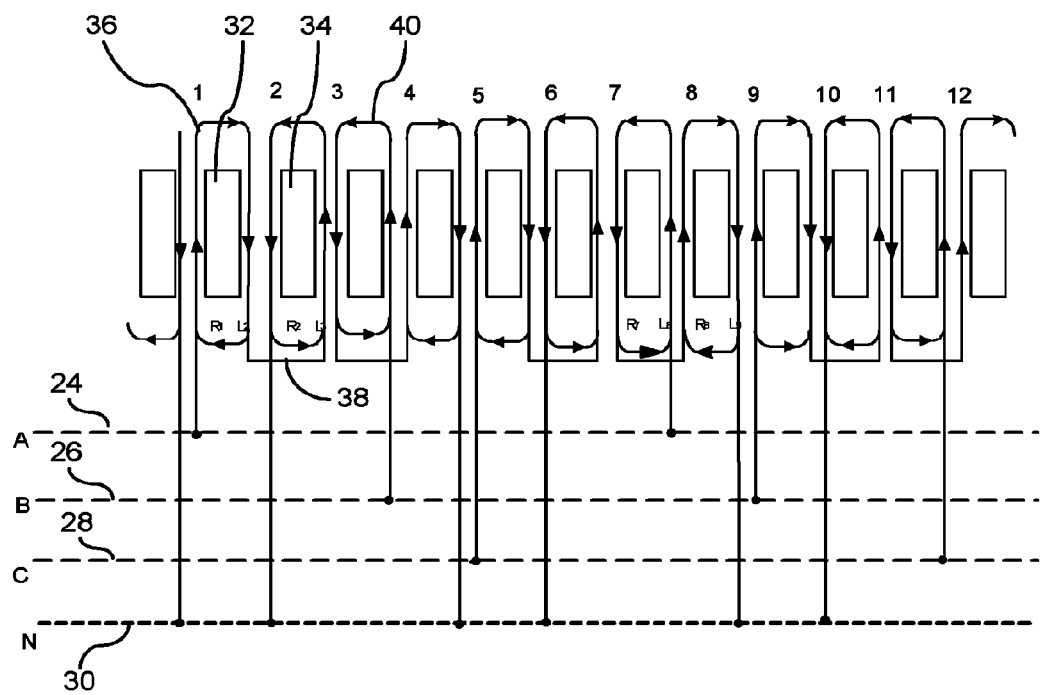
FIG. 4 is an electrical schematic of a concentrated winding configuration for a 3-phase electric machine.
Figures 5, 6, 7:
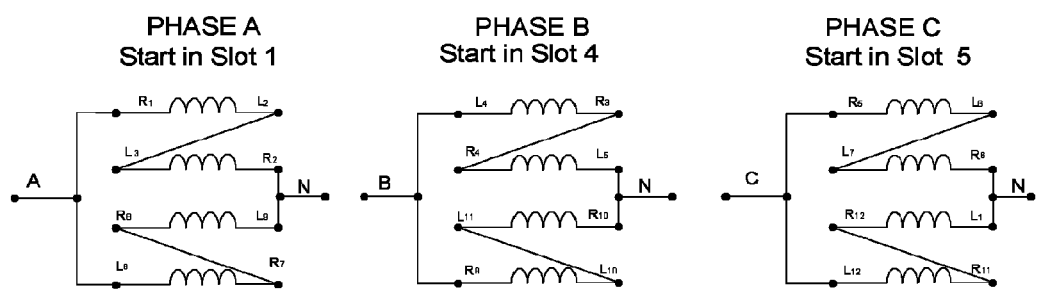
FIG. 5 is an electrical schematic of a concentrated winding configuration for a first phase of the electric machine.
FIG. 6 is an electrical schematic of a concentrated winding configuration for a second phase of the electric machine.
FIG. 7 is an electrical schematic of a concentrated winding configuration for a third phase of the electric machine.

A plurality of magnets 16 are radially disposed between the first stator 12 and second stator 14. The plurality of magnets 16 are retained by a magnet holder 18 in a cylindrical configuration that are rotatable in the space created between the first stator 12 and the second stator 14. A cross section view of the magnet holder 18 and a respective magnet are shown generally in FIG. 3. It should be understood the magnet holder is only one configuration and is not limited to the magnet holder as illustrated. The first stator 12 is disposed radially outward from the plurality of magnets 16 by a respective distance thereby forming a first air gap 20 therebetween. The second stator 14 is disposed radially inward from the magnet holder 18 by a respective distance thereby forming a second air gap 22 therebetween. The first stator 12 in cooperation with the second stator 14 and plurality of magnets 16 generate a flux path, as shown, for creating an electromagnetic field which is converted into mechanical energy in the form of a torque. The alignment of the stator poles of the first stator 12 to the stator poles of the second stator 14 are angularly offset from one another. It should be understood that depending upon the specific electric machine operating requirements, the respective stator poles of both respective stators may be angularly aligned with one another or angularly offset with one another as illustrated.

The magnet holder 18 is coupled to a shaft 24 at a first end of the magnet holder 18. The magnet holder 18 is supported by a bearing surface 25 at second end of the magnet holder 18. The shaft extends axially through the electric machine 10 and is co-axial to the plurality of magnets 16. A first bearing 26 and a second bearing 28 supports the shaft 24 as it extends through the machine housing 15. The shaft extends through apertures in the machine housing 15 and is configured for coupling to a respective component 29 exterior of the electric machine 10 for applying torque to the respective component 29. The component may include an actuator for the active suspension system, electric steering system, electric braking system or like system. The magnet holder 18 is preferably made from non-magnetic stainless steel. Alternatively, the magnet holder 18 may be produced from other non-magnetic materials which provide adequate strength for transmitting mechanical torque to the respective vehicle system. The magnetic holder 18 in cooperation with the bearing surface 25 and the coupling to shaft 24 which is supported by bearings 26 and 28 maintain a spatial relationship between the first and second stators 12 and 14. The respective bearings allow the magnet holder 18 and plurality of magnets 16 to rotate in the space formed radially between the first stator 12 and second stator 14.

The electric machine 10 as shown in FIG. 1 eliminates the conventional rotor with an integrally formed rotor shaft typically used in conventional electric motors such as permanent magnet electric machines. The second stator 14 in cooperation with the second air gap 22 not only functions as the rotor core for providing the magnetic flux path that would otherwise be provided by the rotor core in a standard permanent magnet motor, but also generates torque to increase torque density. The elimination of the conventional rotor core and integral formed shaft reduces the overall weight of the rotary part of electric machine thereby reducing the inertia of the electric machine 10. At the same time, in addition to the torque generated by the first stator and coreless PM rotor, the second inner stator in cooperation with coreless rotor can generate additional torque to increase the torque density within package size.

As discussed earlier, both the first stator 12 and second stator 14 have non-overlapping concentrated windings. FIGS. 4-7 show winding configurations illustrating the concentrated winding. It should be understood that the winding concentrated winding configuration is for exemplary purposes and that any configuration of concentrated windings may be used herein. The electric motor 10 is a three phase motor having a first phase (A), a second phase (B), and a third phase (C).

Figures 8, 9:
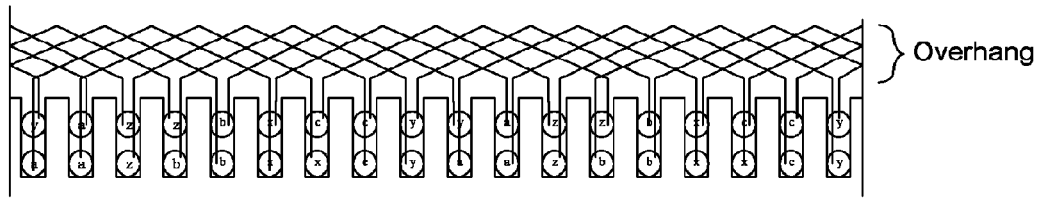
FIG. 8 is an electrical schematic of a winding configuration for a prior art conventional overlapping winding.
FIG. 9 is a table illustrating optimized rotor pole to stator slot combinations.

A respective pair of successively wound stator poles is represented by stator pole 32 and stator pole 34 illustrates concentrated winding configurations. Windings around stator poles 32 and 34 are electrically coupled to phase A. A first winding 36 is formed around stator pole 32 in a concentrated configuration, which includes continuously wrapping stator pole 32 with a predetermined number of turns before an exit wire 38 exits the stator pole 32 and continues uninterrupted to the next stator pole 34. At stator pole 34, a second winding 40 is formed by continuously winding stator pole 34 with the predetermined number of turns. The second winding 40 thereafter electrically couples to a neutral point 30. A next successive pair of stator poles is electrically coupled to phase B using the concentrated winding configuration. Similarly, the next successive pair of stator poles is electrically coupled to phase C using the concentrated winding configuration. The winding pattern is repeated for each of the remaining successive pair of stator poles of the respective stator. In contrast, a conventional lapping winding configuration includes winding a respective pole using only a single turn before proceeding to a next pole. The winding of the conventional lapping configuration is continued in succession thereby ultimately returning to each previously wound pole to add additional turns around the stator pole. As a result, the number of exit wires that electrically connect the successive stator poles will be equal to the number of turns formed on each stator pole. The plurality of exit wires between successive poles lap one another thereby creating an overhang extending radially outward from the respective stator as illustrated in FIG. 8. In the preferred embodiment, shown in FIG. 4, only a single exit wire electrically connects a respective pair of stator poles. The single non-overlapping exit wire results in a significantly reduced overhang in comparison to the conventional lap winding configuration. The reduction in the overhang results in an increase in the active length of the stator within package size for increasing the torque density and the fill factor of the winding which provides for high power density with fast response times. That is, in the concentrated winding configuration, the majority of the overall winding is formed as part of the turns as opposed to the exit wires coupling the respective turns, thereby concentrating the length of the entire winding to each of the respective stator poles. This results in reducing the stator copper loss and improving efficiency of the electrical machine. For same package size, the reduced length of end turns results in longer active stator length thereby achieving a high torque to ampere ratio or high power density for the same operating range. Due to the improved efficiency, the increased machine power density does not affect its thermal performance.

In utilizing the electric machine with concentrated windings, an increased number of rotor poles (i.e., magnets) in comparison to a conventional rotor may be preferably used. Increasing the number of poles allows the thickness of the stator core to be reduced. Reduction of the stator core thickness, in addition to eliminating the conventional integral formed rotor core and shaft, results in an overall weight reduction of the electrical machine. Moreover, the increase in the number of poles in the electrical machine also generates sinusoidal back emf which provides an advantage of reducing torque ripple.

It should be understood that a respective pole/slot combination may be selected for optimizing the torque output of the electric machine in addition to decreasing the current draw and torque ripple. FIG. 9 illustrates a table identifying a rotor pole (i.e., magnets) to stator slot combination. The table identifies a least common multiple (LCM) factor between the rotor pole and stator slot combination, and in addition, a winding factor is shown in certain combinations. The (LCM) is the smallest whole number that is divisible by each of the combination values. The higher the LCM factor, the lower torque ripple that is generated. Preferably, a rotor pole number of greater than 8 is selected and rotor pole and slot combination having a LCM of at least 36 has to be selected.

The winding factor is defined by the ratio of flux linked by an actual winding to flux that would have been linked by a full pitch concentrated winding with the same number of turns. The higher the winding factor value, the higher the torque density. Preferably, a winding factor of greater than 0.7 is selected.

When selecting a combination which affords the advantages described herein, a combination offering the highest LCM and the highest winding factor should be selected. However, selecting the combination with the highest LCM and winding factor has drawbacks. For example, those combinations having an odd number of stator slots can induce unbalanced magnetic pull which results in vibration. Combinations that are acceptable selections are those identified with an asterisk notation. Those combinations having a high LCM values and winding factors but are suspect to vibration are those with an odd number of slots and are represented with a # notation.

While certain embodiments of the present invention have been described in detail, those familiar with the art to which this invention relates will recognize various alternative designs and embodiments for practicing the invention as defined by the following claims.

What is claimed is:

1. An electric machine comprising:
   a plurality of magnets for generating a first magnetic field;

a non-magnetic magnet holder for retaining the plurality of magnets, the magnet holder having a circular configuration with the plurality of magnets being positioned around the circular configuration of the magnet holder;

a first stator disposed radially outward from the plurality of magnets for generating a second magnetic field, the magnet and the first stator having a first air gap formed therebetween, the first stator including a plurality of stator poles separated by slots with each of the stator poles having a concentrated winding with a respective number of turns formed around each respective stator pole, each respective concentrated winding within the first stator comprising non-overlapping phases; and a second stator disposed radially inward from the plurality of magnets for generating a third magnetic field, the magnet and the second stator having a second air gap formed between, the second stator having a plurality of stator poles separated by slots with each of the stator poles having a concentrated winding with a respective number of turns formed around each respective stator pole, each respective concentrated winding within the second stator comprising non-overlapping phases;

wherein the magnet holder and magnets retained therein are rotatable between the first stator and second stator, wherein the concentrated windings of the first stator and the second stator increase an active length of the windings of each respective stator, and wherein the concentrated winding reduces an overhang of each respective winding with respect to each stator pole of each stator for improving torque efficiency.

2. The electric machine of claim 1 wherein the magnet holder and the magnet forms a coreless rotor.

3. The electric machine of claim 1 wherein the inner stator includes a same number of stator poles as the outer stator.

4. The electric machine of claim 1 wherein each respective magnet represents a respective rotor pole, wherein a combination of a number of rotor poles and a number of stator slots have a least common multiple of at least 36.

5. The electric machine of claim 4 wherein the concentrated windings include a winding factor of greater than 0.7.

6. The electric machine of claim 4 wherein number of magnet poles is at least 8.

7. The electric machine of claim 4 wherein the number of stator slot is an even integer.

8. The electric machine of claim 1 further comprising a shaft coupled to the magnet holder and is co-axial to the magnet holder, the shaft being configured for coupling to a driven component, wherein an electromagnetic force generated by the magnet, first stator, and second stator is converted into a mechanical torque, the mechanical torque being applied via the magnet holder and shaft to the driven component.

9. The electric machine of claim 8 wherein the magnet holder is adapted to be coupled to an actuator for an active suspension system.

10. The electric machine of claim 8 wherein the magnet holder is adapted to be coupled to an actuator for a semi active suspension system.

11. The electric machine of claim 8 wherein the magnet holder is adapted to be coupled to an actuator for an electric power steering system.

12. The electric machine of claim 8 wherein the magnet holder is adapted to be coupled to an actuator for an electromechanical braking system.

13. The electric machine of claim 8 can be used as traction machine for a hybrid propulsion system.

14. The electric machine of claim 8 can be used as traction machine for a fuel cell propulsion system.

15. The electric machine of claim 8 can be used as traction machine for an electrical propulsion system.

16. The electric machine of claim 1 wherein the respective inner stator poles are angularly aligned with respective outer stator poles.

17. The electric machine of claim 1 wherein the respective inner stator poles are angularly offset with the respective outer stator poles.

* * * * *